United States Patent [19]

Markow

[11] Patent Number: 4,794,966
[45] Date of Patent: Jan. 3, 1989

[54] RUN-FLAT TIRE INCORPORATING BAND SEGMENT AND COIL MEMBERS

[75] Inventor: Edward G. Markow, Oakdale, N.Y.

[73] Assignee: Grumman Aerospace Corporation, Bethpage, N.Y.

[21] Appl. No.: 40,891

[22] Filed: Apr. 21, 1987

[51] Int. Cl.⁴ ............................................. B60C 17/00
[52] U.S. Cl. .................................... 152/516; 152/156; 156/110.1; 156/165
[58] Field of Search ............... 152/516, 520, 156, 158; 156/165, 126, 121, 117, 110.1

[56] References Cited
U.S. PATENT DOCUMENTS
4,708,186 11/1987 Kopsco et al. ...................... 152/516

Primary Examiner—Michael W. Ball
Assistant Examiner—Ramon R. Hoch
Attorney, Agent, or Firm—Pollock, Vande Sande & Priddy

[57] ABSTRACT

In order to maintain a pneumatic tire in an operational state after the tire has been deflated, a combined structure is embedded within the crown portion of the tire to resist compressive forces encountered when the tire is deflated. The combined structure includes a prestressed coil located adjacent coaxially spaced band segments. Radial plies are present in the tire to transmit compressive forces from a ground contact area to the combined structure which resists the compressive forces successfully.

7 Claims, 3 Drawing Sheets

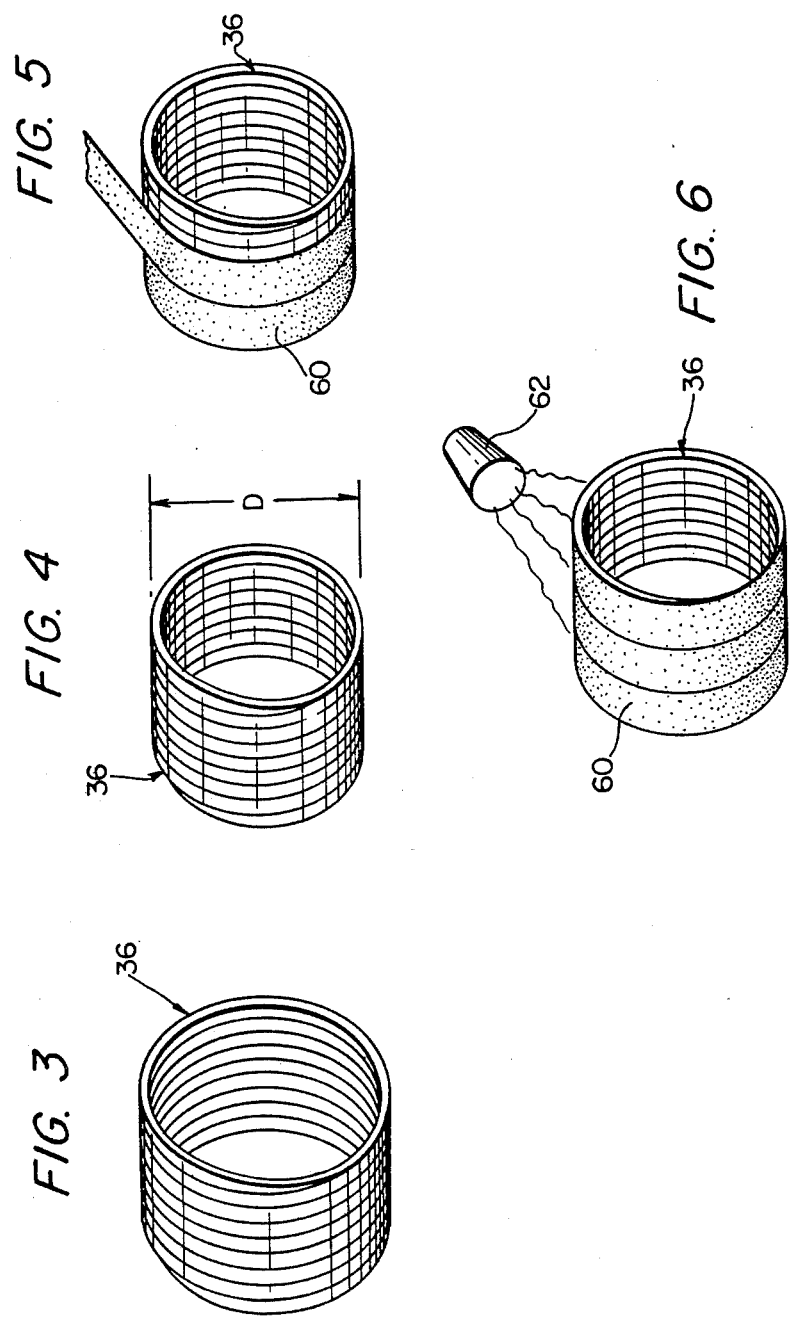

RUN-FLAT TIRE INCORPORATING BAND SEGMENT AND COIL MEMBERS

FIELD OF THE INVENTION

This invention relates to radial run-flat pneumatic tires and, more particularly, to a run-flat tire having structural helical coil and segmented band compression elements inserted in the crown portion.

BACKGROUND OF THE INVENTION

An area of tire technology which has engaged investigators over the years is the run-flat pneumatic tire concept. A run-flat pneumatic tire is one designed to support a vehicle for operation even if the tire has partially or totally lost its inflation pressure. The advantages of such a tire in safety, convenience, cost and weight and space saving are obvious. A recent successful development in the art of run-flat tires is the band-reinforced radial tire designed by the inventor of the present application, which banded tire is the subject of U.S. Pat. No. 4,111,249, granted to Edward G. Markow and assigned to the assignee of the present invention. The run-flat tire in the Markow patent is hereby incorporated herein by reference.

A banded run-flat tire is a pneumatic radial tire having a casing with a crown and sidewalls extending from the crown on either side to annular beads, which, in conventional way, are used to mount the tire in a sealed relationship on the rim of a wheel. In the design the band element, which usually is a thin structural ring of high-strength steel or a fiber/epoxy composite, is incorporated circumferentially into the crown of the tire under the tread thereof. Radial tires, as is well known, have one or more plies containing a multiplicity of closely spaced radial reinforcing cords or wires in the sidewalls of the tire casing. In the tire disclosed in the above-referenced patent to Markow, the radial cords or wires function as spoke-like reinforcing elements to stabilize the circumferential band. When the tire is deflated, the radial spoke-like elements and the band stabilized thereby form a load-sustaining structure analogous to an elastic arch. In the design the band receives vertical, drag, and side loads from the road or ground surface and carries those loads in compression and bending; the radial spoke-like elements act as tension members to support the axle. A prime function, also, of the closely spaced radial elements is to stabilize the thin band against buckling. Although the patented design operates satisfactorily, improvements have been sought to improve the life and performance of a run flat tire as well as reducing manufacturing costs.

BRIEF DESCRIPTION OF THE PRIOR ART

U.S. Pat. No. 4,428,411 and divisional U.S. Pat. No. 4,459,167, granted to the present inventor and assignee, are directed to an improved radial run-flat pneumatic tire having a casing with an annular compression element therein underlying the crown and sidewalls extending therefrom on either side to annular beads. A standard radial tire casing having one or more plies of radial textile cords or metal wires extending from bead to bead can be used for the tire. In that prior art design, the annular compression element in the crown of the tire is a helix with closely spaced coils, which helix is positioned inside the casing of the tire on the inside surface of the tire crown radially inwardly of the tread portion. In operation, the annular compression element cooperates with the radial element in the tire sidewalls which act as individual tension spokes to provide load supporting strength such that the compression element is reinforced thereby. The compression element is a helix made by winding a solid or hollow rod of suitable cross-section on a cylinder. Variations in the lateral flexibility of the element can be attained by varying the size, configuration, or material properties of the axially outer coils with respect to the axially inner coils of the helix. In that prior art tire, the compression element can be installed in the tire during the tire manufacturing process. Installation of the compression element into the tire can be effected by winding up the helix to reduce its diameter such that it can be installed through the beads into the tire interior. Alternately, the end of an end coil of the helix can be separated from the other coils of the helix and introduced over the bead into the tire casing and the remaining coils can be fed into the casing by a relative rotation between the tire and the helix.

BRIEF DESCRIPTION OF THE PRESENT INVENTION

The present invention is an improvement over the helical coil band tire of the previously described prior art patent and relies upon technology in U.S. Pat. Nos. 4,673,014 and 4,708,186 assigned to the same assignee as this application.

In U.S. Pat. No. 4,673,014, a free coil having a diameter approximately 50 percent larger than the finished tire is coated with an appropriate adhesive and placed on a suitable cylindrical mandrel so that it may be wound until its outer diameter is brought to a reduced desired size, prestressing the wound coil. With the wound coil retained in this condition, its outer surface receives either a resin pre-impregnated fiber tape; or adhesive covered rubber tape which is tightly wound around the coil to completely overwrap the outer diameter of the wound prestressed coil. The resin is then cured and a band comprising a prestressed wound helical coil having an integral cylindrical outer sheath is produced. When the band is removed from the mandrel, it is ready to be installed into a run-flat tire carcass or be put to any other suitable use.

Alternatively, the final curing of the tape can be delayed until after the coil is suitably positioned in the carcass of a run-flat tire during the tire making process. The tire structure and the resin-impregnated tape or rubber tape can then be co-cured in situ.

The utilization of an overwrapping tape secures the individual windings of the coil thereby avoiding the necessity of specially forming the surfaces of each coil winding to effect interengaging coils as disclosed in the mentioned prior art patents.

By relying upon a helical structure in the present invention, the band is prestressed in the direction of lowering the stress in a flattened footprint area of a tire, the area most vulnerable to road impact stresses. In addition, unlike the helical coil band disclosed in the previously mentioned patents, the present structure can be stocked and handled in exactly the same manner as conventional compression bands. In the alternate situation where the band is co-cured with the tire, substantial economies in manufacture can be realized by the co-curing step.

The use of separated bands in a run-flat tire are disclosed in the U.S. Pat. No. 4,708,186, which represents an alternate concept of run-flat tire construction.

In order to improve interlaminar shear of a run-flat tire utilizing a coil, this invention discovers that superior results may be achieved when solid bands are added to the tire structure and more particularly within the crown portion thereof.

BRIEF DESCRIPTION OF THE FIGURES

The above-mentioned objects and advantages of the present invention will be more clearly understood when considered in conjunction with the accompanying drawings, in which:

FIGS. 3-6 disclose sequential steps in the formation of a resin-cured helical-coil band;

DETAILED DESCRIPTION OF THE INVENTION

Figure 1:
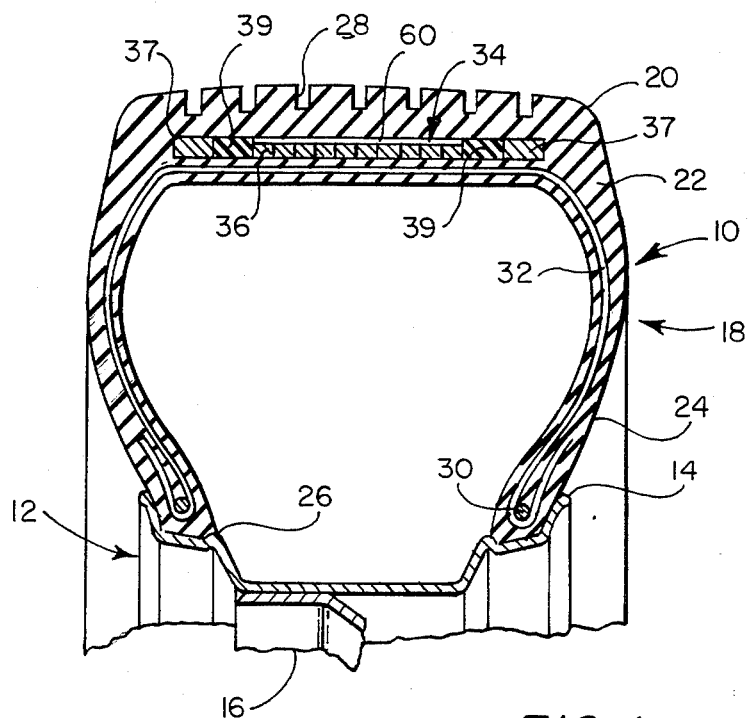
FIG. 1 is a sectional view of a tire in accordance with a first embodiment of the present invention.

Having now more particular reference to the drawings, FIG. 1 illustrates a first embodiment of a tire 10 of the invention mounted on a wheel 12 which may be of a conventional type having a drop center rim 14 welded to a wheel body 16. Tire 10 comprises a carcass or casing 18 having an outer peripheral tread portion 20 in the crown 22 of the casing and sidewalls 24 extending from either side of the crown to beads 26 in the inside peripheral portions of the sidewalls. Grooves 28 in any desired pattern can be incised in tread portion 20 of the casing 18. Beads 26, which can be reinforced with the usual annular cords or wires 30, are adapted to seat in an airtight relationship in the rim 14 when the tire is mounted on the wheel 12. The sidewalls 24 are reinforced by the usual known weftless radial plies or elements 32. Radial elements 32 can be fabricated out of steel wires or suitable textile fibers as is well known in the art. When mounted on the wheel 12, tire 10 can be inflated through the usual valve (not shown in the figures) in the rim of the wheel.

Figure 2:
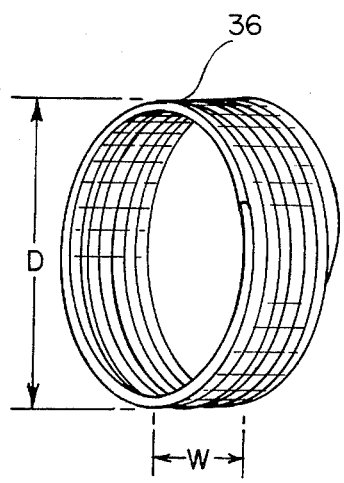
FIG. 2 is a perspective view of a helical compression element of a tire as employed in the present invention.

It will be recognized that the description to this point could apply to the usual radial tire. A run-flat capability is imparted to the radial tire by combined annular structural means 34 including helical coil compression element 36 (FIGS. 1, 2) in the center of crown 22, underlying the tread and located radially outwardly of the carcass reinforcing plies. The helix compression element is preferably a multiple-coil helix of the type disclosed in U.S. Pat. No. 4,673,014, utilizing high-strength material such as a suitable metal or reinforced plastic or composite. High strength, in the context of the materials used in the annular compression element, is understood to mean materials having a tensile strength in the range of about 150 ksi and over.

The helix 36 can be fabricated by a suitable pultrusion or filament winding process to produce a suitable cross-sectional shape so as to impart a desired physical response to various operating conditions. Twist of approximately 5 degrees provides additional interlaminar shear resistance.

By wrapping a layer of resin-impregnated tape 60 (FIGS. 1, 5) over the windings of the helix 36, the helix is preformed prior to its insertion in a tire so that the bands may be stocked and handled in exactly the same manner as conventional compression bands. This is discussed in the copending application.

FIGS. 3-6 illustrate the method for fabricating the helix of the present invention as taught in the copending patent application. In FIG. 3 a helix, formed by pultrusion or filament winding techniques, is coated with an appropriate adhesive system and positioned on a suitable cylindrical mandrel (not shown) so that it may be wound in the direction of helix twist until tee normal free outer diameter of the windings are reduced by approximately 50 percent to a desired diameter D, as shown in FIG. 4, prestressing the helix. Adjacent windings in the helix coil are in close proximity or abut one another. With the wound prestressed helix retained in this condition, its outer surface is suitably prepared to receive a resin-impregnated tape 60 which is tightly wound spirally, as shown in FIG. 5, around the helix to completely overlap or encapsulate the outer diameter of the helix and to lock in the prestress. In FIG. 6, a heat source 62 cures the resin of the tape which results in the formation of a band comprising a prestressed wound helix having an integral cylindrical outer sheath. When the band is removed from the mandrel, it is ready to be installed into a run-flat tire carcass or to be put to any other suitable use.

The above-described process is amenable to low-cost production wherein the tape 60 would overwrap an initial helix having a length substantially longer than would be finally incorporated in a single tire. After curing, as previously explained, it is possible to use a lathe cutting tool and spacing the cuts transversely along the axis of the helix so that individual sections of the long helix result, each having the required dimension in width for use in a separate tire.

As taught in the copending application, in an alternate embodiment the helix wrapped in pre-impregnated tape can be positioned within a tire carcass before either have been cured. The heat normal to the rubber cure can be used to cure the helix in situ. The advantage of this approach is to avoid separate curing steps of the tire carcass and helix. Accordingly, production economies can be realized.

In addition to the centrally located helix 36, FIG. 1 illustrates the completion of a first embodiment of the present invention, wherein band segments 37 are included in the crown portion of the tire as shown in FIG. 1. This figure indicates the utilization of two spaced band segments located in coaxial relationship with the helix 36. Sections 39 indicate the existence of elastomeric material between the band segments 37 and the helix 36. The elastic material may be in separately installed bands or an integral portion of the crown rubber. The band segments 37 may be fabricated from metal or composite materials such as Fiberglas-epoxy. Other possibilities include exotic high strength materials such as titanium. Utilization of metal or composite band segments as relied upon in the present invention are disclosed in the previously mentioned copending application 838,450.

The advantage of utilizing the helix and band segments in a unique combination, relates to improved performance of the tire and more particularly the increase in resistance to interlaminar shear.

Figure 7:
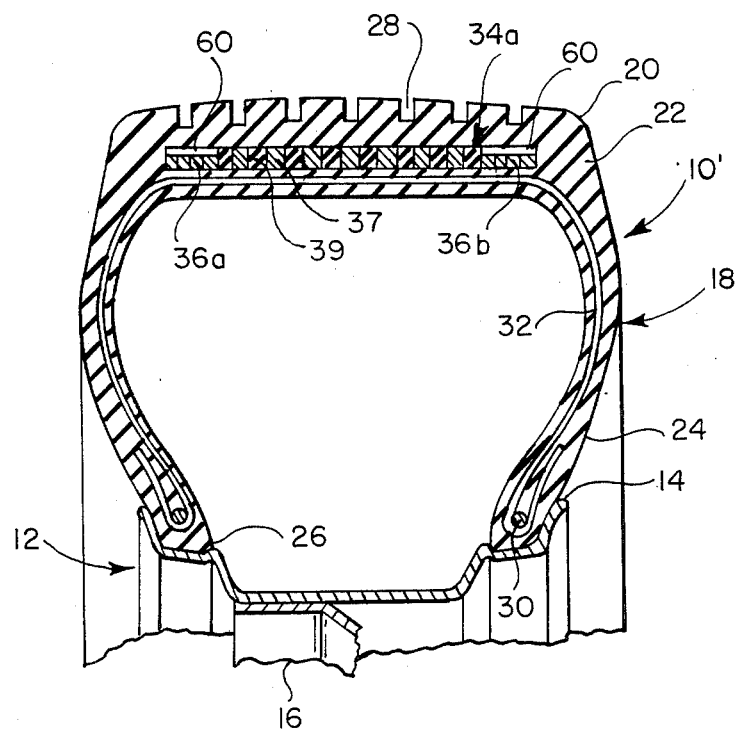
FIG. 7 is a sectional view of a second embodiment of the invention.

A second embodiment of the present invention, utilizing a helix and band segments in combination, is detailed in FIG. 7. In this second embodiment, a tire 10' has a helix-band combination which is reversed from that of FIG. 1 and is indicated by reference numeral 34a. In this second embodiment, the band segments 37 are located in the central portion of the crown 22 while two helixes 36a and 36b are coaxially spaced from the centrally located band segments As in the case with the first embodiment of FIG. 1, the band segments and helix members are of the same diameter. However, the diameter of the two major structural members may be different from one another so that there is greater conformity between the axially outward members and the tire profile enhancing handling properties of the tire that are related to foot print shape.

Reference numeral 39 indicates the existence of sections where elastomeric material exists between the band segments. As explained in connection with FIG. 1, this elastomeric material may be the integral material from the tire crown or may in fact be separate inserts of different elastomeric material to achieve desired performance criteria, including superior resistance to compression forces during deflation Further possibilities for the embodiments of FIGS. 1 and 7 include the utilization of Kevlar as a material for the band segments. Also, although FIGS. 3-6 are directed to resin-impregnated tape, a rubber overwrap may be employed over the helix member as mentioned previously.

A major function of the compression band an helix elements is to act in conjunction with the radial sidewall plies and create a structure capable of supporting a full load even when the tire is deflated. When the tire is pressurized, these elements act as tensile members in a normal fashion. However, when the tire is deflated, these elements are supported and stabilized by the radial sidewall elements such that they act as a structural flexible-arch compression member which can support the unpressurized tire for operation under load.

It should be understood that the invention is not limited to the exact details of construction shown and described herein for obvious modifications will occur to persons skilled in the art.

I claim:

1. In a run-flat pneumatic tire including an elastomeric casing with a tread formed in a crown portion thereof and sidewalls extending from the crown portion to generally circular beads adapted to normally seat themselves in air tight secured relationship with a wheel, a combined structure for resisting compressive forces on the tire when deflated, the structure comprising:

a prestressed helical coil having adjacently positioned windings embedded in said crown portion;
   a strip of material wrapped around the exterior of the coil and bonded thereto for ensuring permanent retention of the coil in a prestressed condition;
   a plurality of resilient coaxially spaced band segments located within the crown portion and laterally adjacent the coil wherein the segments reduce the interlinear shear stresses exerted by the coil when the tire is deflated; and
   a plurality of radial means embedded within the casing for transmitting compressive load forces to the combined resistive structure when the tire is deflated.

2. The structure set forth in claim 1 wherein elastomeric material is present between individual band segments for transferring the compressive forces to all band segments.

3. The structure set forth in claim 2 wherein the coil is centrally located within the crown portion and further wherein the band segments are located within the crown portion at opposite ends of the coil.

4. The structure set forth in claim 2 wherein a plurality of coaxially spaced band segments are centrally located within the crown portion and further wherein coils are located within the crown portion, at opposite ends of the band segment plurality.

5. In the method for building a run-flat pneumatic tire having a casing with a tread in the crown portion thereof and sidewalls extending from the crown portion, the method including steps of
   prestressing a helical coil to a final diameter less than that of its free diameter;
   wrapping a strip of material around the coil while the latter is in a prestressed condition;
   allowing a bonding agent to contact the strip and the windings of the coil;
   embedding the prestressed wrapped coil inside the crown portion of the tire;
   locating a plurality of band segments laterally adjacent the coil;
   curing the resulting tire wherein the band segments and the coil cooperate to successfully resist compressive forces encountered during deflation of the tire.

6. The method set forth in claim 5 wherein the coil is centrally located within the crown portion and further wherein the band segments are located within the crown portion at opposite ends of the coil.

7. The method set forth in claim 5 wherein a plurality of coaxially spaced band segments are centrally located within the crown portion and further wherein coils are located within the crown portion, at opposite ends of the band segment plurality.

* * * * *

UNITED STATES PATENT AND TRADEMARK OFFICE
CERTIFICATE OF CORRECTION

PATENT NO. : 4,794,966

DATED : January 3, 1989

INVENTOR(S) : Edward G. Markow

It is certified that error appears in the above-identified patent and that said Letters Patent is hereby corrected as shown below:

Column 4, line 7, change "tee" to --the--.

Signed and Sealed this

Twenty-seventh Day of June, 1989

Attest:

DONALD J. QUIGG

Attesting Officer

Commissioner of Patents and Trademarks